Sept. 25, 1962     L. J. KIMPEL     3,055,100
METHOD OF FORMING INTERLOCKING JOINT
BETWEEN TELESCOPED MEMBERS Filed July 1, 1957     2 Sheets-Sheet 1

*INVENTOR.*
LOUIS J. KIMPEL
BY
*Whittemore, Hulbert & Belknap*
ATTORNEYS

Sept. 25, 1962 L. J. KIMPEL 3,055,100
METHOD OF FORMING INTERLOCKING JOINT
BETWEEN TELESCOPED MEMBERS
Filed July 1, 1957 2 Sheets-Sheet 2

INVENTOR.
LOUIS J. KIMPEL
BY
*Whittemore, Hulbert & Belknap*
ATTORNEYS

United States Patent Office 3,055,100
Patented Sept. 25, 1962

3,055,100
METHOD OF FORMING INTERLOCKING JOINT BETWEEN TELESCOPED MEMBERS
Louis J. Kimpel, Defiance, Ohio, assignor to The Zeller Corporation, Defiance, Ohio, a corporation of Ohio
Filed July 1, 1957, Ser. No. 669,352
2 Claims. (Cl. 29—520)

The invention relates to a method of interlocking telescopically engageable members so as to hold the same from detachment and form thereof a rigid structure.

It is the object of the invention to obtain a construction responsive to pressure applied to one of said members in one direction to deflect a portion thereof in a transverse direction. It is a further object to obtain a construction in which said transverse deflection crosses the meeting faces of said telescopically engaged members from one thereof to engage a shoulder on the other member. Still further it is an object to obtain a construction where the deflected portion of the member to which pressure is applied engages a recess in the other member. With these objects in view the invention consists in the construction of the telescopically engageable elements and the method of interlocking the same as hereinafter set forth.

Figure 4:
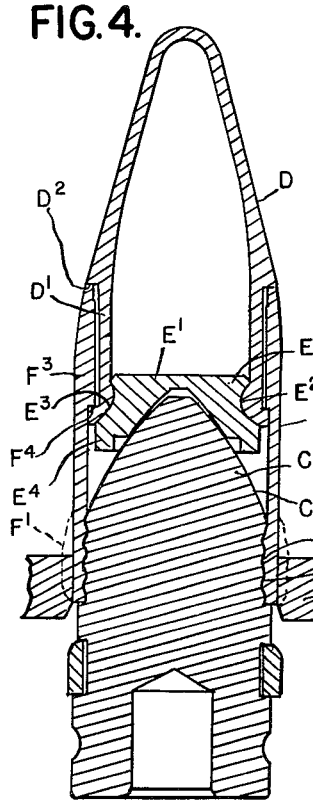
FIG. 4 is a longitudinal section through an explosive or incendiary shell projectile, the elements of which are interlocked by my method.

F°G. 6 is a view similar to FIG. 4 after telescopic engagement but before interlocking.

Figure 7:
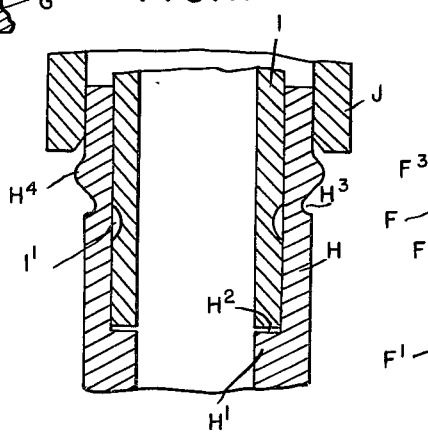
Figure 7:
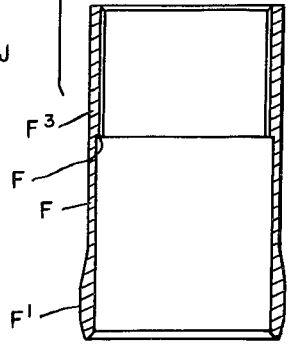
Figure 8:
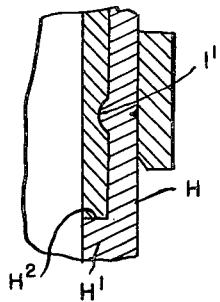

FIGS. 7 and 8 are sections through telescopically engaged members interlocked by a modified construction of joint.

Figure 3:
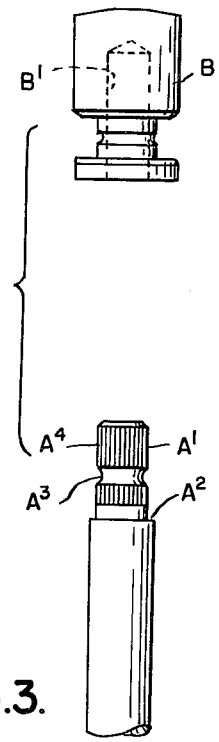
FIG. 3 is an elevation of the two members before telescopic engagement.
Figure 1:
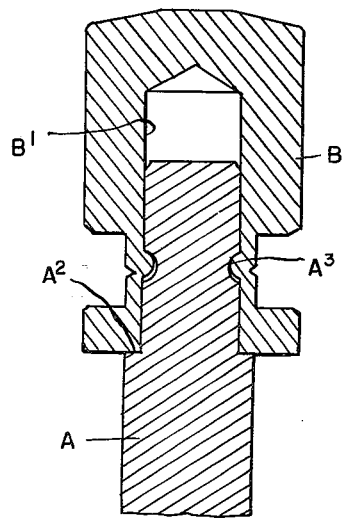
FIG. 1 is a central longitudinal section through a shank member and telescopically engageable head therefor in interlocked condition.
Figure 2:
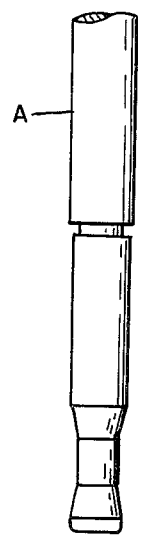
FIG. 2 is a similar view of said members telescopically engaged but prior to interlocking.
Figure 2:
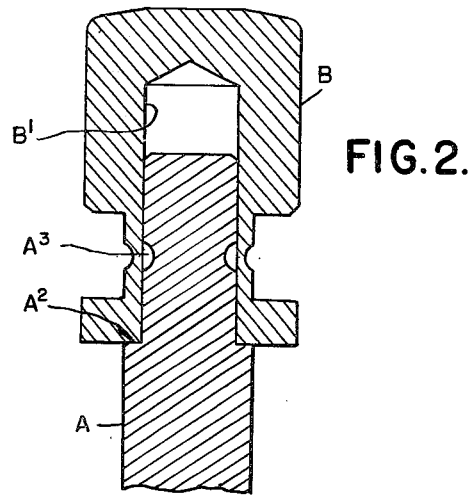

As shown in FIGS. 1 to 3, A is an elongated shank and B is a head therefor which are telescopically engageable with each other and subsequently interlocked. The purpose of this combination is not essential to my invention and may be for any desired use. The shank A is provided with a coaxial end portion A' of smaller diameter with an annular shoulder $A^2$ therebetween. The portion A' has an annular groove $A^3$ therein and preferably also longitudinally extending serrations $A^4$ on one or both sides of said groove. The head B is of a major diameter greater than that of the portion A' and has an axial bore B' extending through a portion of its length for receiving and snugly fitting said portion A'. The end of the member B at the entrance of said bore engages the shoulder $A^2$ when the members A and B are telescopically engaged. Between the opposite end portions of the member B which are of said major diameter is a portion $B^2$ of a smaller diameter which is substantially that of the shank A. This portion $B^2$ has an annular groove $B^3$ in the periphery thereof which is in substantial registration with the groove $A^3$ of the portion A' when said members A and B are telescopically engaged. To interlock the two members axial pressure is applied to the head B against the resistance of the shoulder $A^2$ and of sufficient force to buckle inward the portion of $B^2$ inside of the groove $B^3$. This will bring together the portions of $B^2$ which were initially on opposite sides of the groove $B^3$, while the inwardly buckled portion will fill the groove $A^3$. When the member B is being telescopically engaged with the portion A' the serrations $A^4$ thereof which are of slightly greater diameter than the bore B' will embed themselves in the member B and hold the latter against rotation with respect to the shank A.

Figure 6:
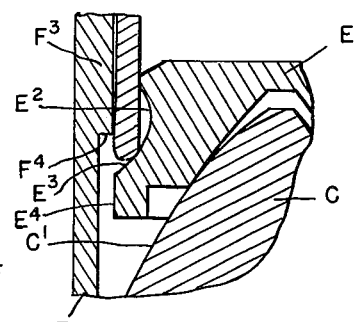
Figure 5:
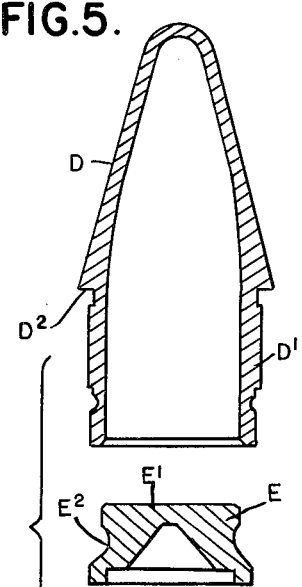
FIG. 5 is a similar view of the elements before telescopic engagement.

With the construction shown in FIGS. 4 to 6, inclusive, the several elements forming a shell are interlocked with each other and with the projectile of which they form a part. In FIGS. 4 and 5, C is the solid head of a projectile which has a tapering nose portion C'. D is a tapering shell for containing an explosive or incendiary filling which is secured to the head C by the elements E and F. The element E forms a closure for the rear loading opening in the shell and which is recessed at E' to fit about and bear upon the nose portion C' of the head C. The element F is a substantially cylindrical sleeve which overlaps portions of the elements C and D and is secured, respectively, to each. For forming an interlocking joint between the elements C and F, the lower end portion of the former has its wall outwardly thickened at F', while its inner surface engages a series of annular corrugations $C^2$ in the member C. By pressing the portion F' radially inward, which may be accomplished by sliding a ring G surrounding the upper portion of the member F downward over the portion F', the latter will be deformed to fit about said corrugations, as indicated at $F^2$. To secure the member F to the members D and E the wall of the upper end portion of said member F is thickened radially inward, as indicated at $F^3$, with a shoulder $F^4$ between the lower end thereof and the continuing downward portion of the member F. The member E has its upper end portion E' fitting within the member D and below such portion an annular groove $E^2$ which in cross section rounds and has a downwardly and outwardly inclined cam portion $E^3$ terminating in a portion $E^4$ which is of larger diameter than the portion E' and fits within the portion $F^3$ of the member F. The member D has a portion D' which fits within the portion $F^3$ with a shoulder $D^2$ for bearing upon the upper end of the member F. The portion D' is of a length to extend down slightly beyond the groove $E^3$ when the members F and E are in position. Thus to interlock these members pressure is applied against the upper end of the member D to force the lower end of the portion D' against the cam portion $E^3$, deforming and directing the same radially outward against the member F below the shoulder $F^4$. Continued pressure will buckle the portion D' radially inward to fill the annular groove $E^2$ of the member E and also force the metal upward against the shoulder $F^4$. This will simultaneously lock the member D to the members E and F.

A third interlocking joint between telescopically engaged members is illustrated in FIGS. 7 and 8. The outer tubular member H has an inwardly extending portion H' forming a shoulder $H^2$ and above this shoulder an annular groove $H^3$ in its outer surface and an annular projection $H^4$ above and adjacent to said groove. The member I telescopically fits within the member H with its lower end contacting the shoulder $H^2$. It is also provided with an annular groove I' in its outer surface located adjacent to but slightly below the annular groove $H^3$ of the member H. To interlock these members the annular projection $H^4$ is pressed downward and inward by a sleeve member J surrounding the member H which irons inward and downward the annular projection $H^4$ filling the groove $H^3$ and also projecting the inner surface of said member H inward to fill the groove I'

In all of these interlocking constructions a portion of the wall of one of the telescopically engaged members responds to axially applied pressure to the said member and against a stationary abutment to deform and project a portion of said member transversely into a groove in the meeting surface of the other of said telescopically engaged members, thereby forming an interlock therebetween.

What I claim as my invention is:

1. The method of interlocking telescopically engaged portions of a pair of members comprising forming an annular groove in the telescopic meeting surface of one of said members, forming an annular bead projecting from the surface of the other member which is opposite its telescopic meeting surface and adjacent to the plane of said groove forming a weakening groove in the surface of said other member adjacent to said projecting bead to weaken the cross section of the same and to locate the displacement in the plane of the annular groove in the first mentioned member, moving a ring tool which engages and slidably fits the latter member axially thereof against and over said bead to iron it inward of the surface from which it projects and to displace a portion of the cross section into said annular groove.

2. The method of interlocking an outer tubular member to an inner member comprising forming an annular groove in the outer surface of said inner member, forming an annular weakening groove in the outer surface of said outer tubular member which is adjacent to the plane of said groove in said inner member, forming an annular bead projecting outwardly from the outer surface of said outer member adjacent said weakening groove, axially moving a ring tool which surrounds and slidably fits the outer surface of said outer member thereby moving said ring member against and over said bead to iron the surface toward said weakening groove and to displace a portion of the cross section into the groove of said inner member, the movement of said ring tool completely eliminating said projecting annular bead and leaving a smooth cylindrical outer surface of uniform diameter except for a slight indentation at the point where there was originally said annular weakening groove.

References Cited in the file of this patent

UNITED STATES PATENTS

| 1,393,171 | Schneider | Oct. 11, 1921 |
| 1,463,144 | Carter | July 24, 1923 |
| 1,570,320 | Serewicz | Jan. 19, 1926 |
| 1,704,228 | Tibbetts | Mar. 5, 1929 |
| 1,744,199 | Baker | Jan. 21, 1930 |
| 1,984,115 | Cooper | Dec. 11, 1934 |
| 2,177,191 | Sandberg | Oct. 24, 1939 |
| 2,485,699 | Christie | Oct. 25, 1949 |
| 2,852,843 | Banta et al. | Sept. 23, 1958 |
| 2,854,744 | Crockett | Oct. 7, 1958 |

FOREIGN PATENTS

| 609,359 | Great Britain | Sept. 29, 1948 |